(12) United States Patent
Cassero et al.

(10) Patent No.: US 11,904,473 B2
(45) Date of Patent: Feb. 20, 2024

(54) TRANSFORMATION MODE SWITCHING FOR A REAL-TIME ROBOTIC CONTROL SYSTEM

(71) Applicant: Intrinsic Innovation LLC, Mountain View, CA (US)

(72) Inventors: Sean Alexander Cassero, Palo Alto, CA (US); Michael Beardsworth, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 1088 days.

(21) Appl. No.: 16/730,864

(22) Filed: Dec. 30, 2019

(65) Prior Publication Data
US 2021/0197373 A1 Jul. 1, 2021

(51) Int. Cl.
*B25J 9/16* (2006.01)

(52) U.S. Cl.
CPC .......... *B25J 9/1653* (2013.01); *B25J 9/1607* (2013.01)

(58) Field of Classification Search
CPC ...... B25J 9/1653; B25J 9/1607; B25J 9/1628; B25J 9/1661; G05B 2219/23289; G05B 2219/39209; G05B 2219/39346
See application file for complete search history.

(56) References Cited

U.S. PATENT DOCUMENTS

| | | | |
|---|---|---|---|
| 5,412,759 A | 5/1995 | Yano et al. | |
| 9,149,931 B2 | 10/2015 | Kamiya | |
| 9,382,643 B2 | 7/2016 | Moore et al. | |
| 9,486,918 B1 | 11/2016 | Darren et al. | |
| 10,668,623 B2 | 6/2020 | Zhang et al. | |
| 2008/0058990 A1 | 3/2008 | Sassatelli et al. | |
| 2017/0274530 A1* | 9/2017 | Mottram | B25J 9/1633 |

(Continued)

OTHER PUBLICATIONS

Ison et al., "Simultaneous myoelectric control of a robot arm using muscle synergy-inspired inputs from high-density electrode grids," 2015 IEEE International Conference on Robotics and Automation, May 2015, pp. 6469-6474.

(Continued)

*Primary Examiner* — Basil T. Jos
(74) *Attorney, Agent, or Firm* — Fish & Richardson P.C.

(57) ABSTRACT

Methods, systems, and apparatus, including computer programs encoded on computer storage media, for performing transformation mode switching in a robotics control system. One of the methods includes receiving data representing a state machine that defines one or more portions of a robotics task; executing a first control loop corresponding to a first node of the state machine, wherein executing the first control loop comprises providing commands to the robotic components computed from a first coordinate transformation process; determining, based on one or more status messages, that an exit condition for the first node has been satisfied; performing a mode switch between the first coordinate transformation process and a different second coordinate transformation process; and executing a second control loop corresponding to a second node of the state machine, wherein executing the second control loop comprises providing commands to the robotic components computed from the second coordinate transformation process.

20 Claims, 3 Drawing Sheets

(56) References Cited

U.S. PATENT DOCUMENTS

2018/0207798 A1    7/2018  Ryoichi

OTHER PUBLICATIONS

PCT International Search Report and Written Opinion in International Appln. No. PCT/US2020/067163, dated Apr. 23, 2021, 18 pages.
Seredynski et al., "Grasp planning taking into account the external wrenches acting on the grasped object," Proceedings of the 10th International Workshop on Robot Motion and Control, Jul. 2015, pp. 40-45.
International Preliminary Report on Patentability International Appln. No. PCT/US2020/067163, dated Jul. 5, 2022, 11 pages.

* cited by examiner

TRANSFORMATION MODE SWITCHING FOR A REAL-TIME ROBOTIC CONTROL SYSTEM

BACKGROUND

This specification relates to robotics, and more particularly to software control of real-time robotic control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position. In this specification, a workcell is the physical environment in which a robot will operate.

One of the fundamental computational tasks for a robotics control system is performing coordinate transformations. A coordinate transformation is a process that converts data expressed in one coordinate space to a different coordinate space. For example, a Cartesian coordinate space can be used to express the position of a robot component in three-dimensional space, e.g., using x, y, and z coordinates. Cartesian coordinates are convenient for human programmers to specify locations at which the robot should move. However, the joint positions of a robot are often expressed in joint coordinate space, which for example, can specify the angles of the joints of a robot rather than their locations in 3D space. Thus, for example, a robot can use a coordinate transformation process that uses inverse kinematics (IK) in order to convert a Cartesian goal specified by a user into a joint goal that can actually be used to control the robot.

One problem with coordinate transformations is their rigidity. One particular coordinate transformation process may be well-suited for one particular portion of a task, but ill-suited for another particular portion of the task. For example, some robotics applications require sub-millimeter precision; in those situations, IK transformations can be unreliable and slow to converge. While it is possible to use different controllers that implement different coordinate transformations, doing so introduces system overhead that is incompatible with the constraints of a truly real-time robotics control system.

SUMMARY

This specification generally describes how a real-time robotic control system can perform real-time transformation mode switching in order to implement multiple different coordinate transformation processes in the same robotics task.

A user of a real-time robotics control system that controls one or more robots can design a state machine for the robots. In this specification, a state machine is a representation of the computational transitions to be performed by a robot. A state machine includes nodes and edges, where each node represents a state of the robot or a set of computations that the robot can execute, and each edge between a first node and a second node represents one or more "exit conditions" that, if satisfied, cause the robot to transition from executing the computations represented by the first node to executing the computations represented by the second node. In this specification, a robotics control system is sometimes referred to as transitioning between nodes of a state machine. This should be understood to mean that the robotics control system transitions from causing the robot to be in a state represented by a first node of the state machine to causing the robot to be in a state represented by a second node of the state machine. In this specification, for convenience nodes of a state machine are sometimes referred to as executing operations, e.g. driving a robot to move in a particular way. This should be understood to mean that the operations represented by the node of the state machine are executed by a system, e.g. a robotic control system that sends commands to the robots.

A state machine designed by the user can have nodes that execute using different coordinate transformation processes. That is, the state machine includes multiple different subgraphs that includes nodes that execute according to a particular coordinate transformation process. The user can specify exit conditions for each subgraph that cause the robotic control system to transition to a different subgraph, i.e., cause the robotic control system to mode switch to a different coordinate transformation process.

Thus, when the robotic control system is in a particular node of the state machine, the robot control system is executing the operations represented by the particular node using the coordinate transformation process of the node, while continuously checking the exit conditions of the node. Whenever one of the exit conditions are met, the robotic control system can transition to a different node of the state machine that uses a different coordinate transformation process, automatically mode switching to the different coordinate transformation process when executing the operations represented by the different node.

While this specification often uses two coordinate transformation processes, inverse kinematics and Cartesian impedance control, as examples of coordinate transformation processes that a real-time robotic control system might switch between when executing task, a real-time robotics control system, appropriately programmed in accordance with this specification, can switch between any number of coordinate transformation processes during execution of a task, e.g., the real-time robotics control system can switch between 3 or 5 different coordinate transformation process. Further, each different coordinate transformation processes can be an appropriate type of coordinate transformation process.

As a particular example, a real-time robotics control system can use admittance control to transform Cartesian goals to joint goals. Admittance control can be effective when a user wishes to regulate the interaction of a robot with the environment. For example, to execute a particular interaction with an object, it might be optimal to use an inverse kinematics coordinate transformation process to arrive at a specific starting goal position, and then mode switch to an admittance control coordinate transformation process to interact with the object. Admittance control can satisfy similar requirements as Cartesian impedance control, except in applications in which the robotic hardware accepts joint positions instead of joint torques. Cartesian impedance control is discussed in more detail below.

As another particular example, a real-time robotics control system can mode switch between two inverse kinematics transformation processes that have different null space handling criteria. For example, an iterative inverse kinematics coordinate transformation process with a desired null space can perform well when the configuration space of the robot is far from singularity, or when waypoints in a trajectory of the robot are close to each other such that the iterative solver is likely to converge. The configuration space of a robot is the space of possible positions that a robot can attain, e.g., a subspace of the joint coordinate space of the robot. A singularity is a configuration of a robot in which the robot end-effector becomes blocked in certain directions. A closed-form inverse kinematics coordinate transformation process, on the other hand, can perform well when certain joint goals are close to a singular configuration.

As another particular example, a real-time robotics control system can mode switch between two inverse kinematics transformation processes that have different cost functions. In certain applications, a user might prefer an inverse kinematics coordinate transformation process that has a particular cost function that provides certain null space behavior advantages. For example, an inverse kinematics coordinate transformation process can assign higher value to null space poses that are closer to the zero vector. Conversely, an inverse kinematics coordinate transformation process can assign higher value to null space poses that are closer to the current pose of the robot. Each of these can provide better system performance in certain scenarios but not others.

As another particular example, a real-time robotics control system can mode switch between two inverse kinematics transformation processes that have different convergence criteria. For example, in a resource-constrained computing environment, a user might prefer to change the inverse kinematics convergence criteria in order to give more computational resources to more complicated algorithms, e.g., to give more resources to complicated algorithms executing during node switching.

Particular embodiments of the subject matter described in this specification can be implemented so as to realize one or more of the following advantages.

In some existing technologies, a robot controller is tied to one particular coordinate transfer process. That is, in order for a system to switch between coordinate transformation processes, the system must stop execution of the current controller and initialize a second controller. This can be a time-consuming process, and would violate the real-time constraints of a real-time robotic control system. In some embodiments described in this specification, a real-time robotic control system can mode switch between coordinate transformation processes while continuing to satisfy the real-time constraints of the system. Thus, the real-time robotic control system that controls one or more robots can be much more reactive to the current state of the robots in a real-time context, performing online mode switching whenever the system determines that an exit condition has been satisfied.

Automatically mode switching between different coordinate transformation processes in real-time can allow a robotic plan to be both more repeatable and more reliable. Forcing a robotic control system to only use a single coordinate transformation process throughout an entire task often means that the selected coordinate transformation process is suboptimal for certain subtasks of the task. Thus, the computed solution for the robotic control system can converge slowly or to a solution that is unreliable or non-compliant. Switching between different controllers that each use a particular coordinate transformation process can also introduce uncertainty to the solution, as shutting down and starting up controllers can take a variable amount of time.

Some embodiments described in this specification further allow a user to tailor a robotic control system to their particular use case, by specifying a state machine that include nodes that each use a different coordinate transformation process and specifying exit conditions that transfer the robotic control system between them. Thus, the state machine can be very adaptive to the user's needs, allowing each subtask of a particular task to be executed using the optimal coordinate transformation process.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
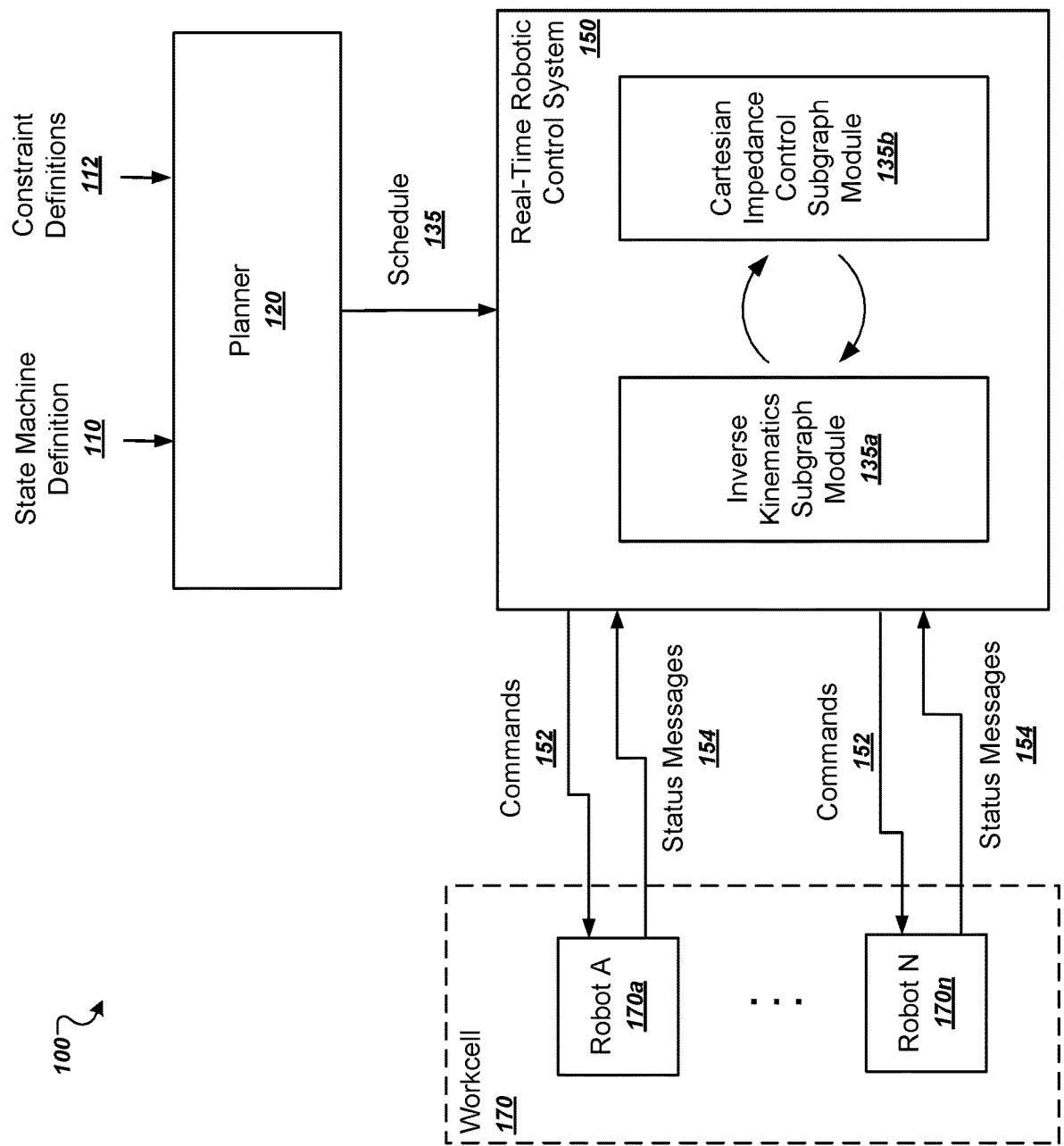
FIG. 1 is a diagram that illustrates an example system.

FIG. 1 is a diagram that illustrates an example system 100. The system 100 is an example of a system that can implement the techniques described in this specification.

The system 100 includes a number of functional components, including a planner 120 and a real-time robotic control system 150. Each of these components can be implemented as computer programs installed on one or more computers in one or more locations that are coupled to each other through any appropriate communications network, e.g., an intranet or the Internet, or combination of networks. The system 100 also includes a workcell 170 that includes N robots 170a-n.

The real-time robotic control system 150 is configured to control the robots 170a-n in the workcell 170. The real-time robotic control system 150 must satisfy one or more hard time constraints in the operation of the workcell 170. For example, one of the robots in the workcell 170 may be required to perform a certain operation at regular intervals, e.g., 10 milliseconds; if the robot ever fails to execute the operation in a given time window, then the robot enters a fault state.

The overall goal of the planner 120 is to generate a schedule that allows the real-time robotic control system 150 to execute one or more tasks. The planner 120 receives a state machine definition 110 for a state machine that is designed to execute the one or more tasks using the robots in the workcell 170. The state machine definition 110 can be generated by a user. The state machine definition 110 can include one or more Cartesian goals for the robots in the workcell 170; that is, the nodes of the state machine can identify user-generated goals for the position and motion of the robots expressed in a real-world Cartesian coordinate space.

In particular, the state machine definition 110 specifies one or more subgraphs of the state machine, where the nodes of each subgraph use a different coordinate transformation process to transform the specified Cartesian goals to joint goals. The joint goals are goals for the position and motion of the robots expressed in the joint coordinate space of the robots. The joint coordinate space of a robot is a representation of the position of the robot expressed in terms of the translational and/or angular displacement of each joint of the robot. For example, a joint space of a robotic arm can be defined by a vector of real-valued joint angles for each joint in the robotic arm.

The state machine definition 110 can also specify exit conditions for one or more nodes in each subgraph of the state machine that, if satisfied, cause the real-time robotic control system 150 to transfer to a different node in a different subgraph of the state machine.

The planner 120 also receives constraint definition 112 that specify constraints on the robots 170a-n during the execution of the state machine. The constraints can be Cartesian constraints or joint constraints. A Cartesian constraint is a constraint on the one or more robots expressed in a real-world Cartesian coordinate space. Example Cartesian constraints can include a particular position in the workcell 170 that must be avoided, or a particular maximum velocity for robotic movement. A joint constraint is a constraint on the one or more robots expressed in the joint coordinate space of the robots. Example joint constraints can include limits on the angular position, acceleration, and jerk of a particular joint of a robotic arm.

The planner 120 uses the state machine definition 110 to generate a schedule 135 for the real-time robotic control system 150 to accomplish the one or more tasks. In particular, the planner 120 can execute, for each node in each subgraph of the state machine, the coordinate transformation of the node specified by the user in the provided state machine definition 110, transforming the Cartesian goals specified in the state machine definition 110 to joint goals.

As a particular example, the planner 120 can generate two modules that each execute the operations represented by a particular subgraph of the state machine: an inverse kinematics subgraph module 135a and a Cartesian impedance control subgraph module 135b. An example state machine that includes two subgraphs is described in more detail below in reference to FIG. 2. When generating the respective modules, the planner 120 can use inverse kinematics to transform the Cartesian goals of each node in the inverse kinematics subgraph to joint goals, and Cartesian impedance control to transform the Cartesian goals of each node in the Cartesian impedance control subgraph to joint goals.

Using the generated joint goals, the planner 120 can generate a schedule 135 for the real-time robotic control system 150. The schedule 135 can specify commands 152 for the real-time robotic control system 150 to send to the workcell 170 to accomplish the joint goals. The schedule 135 can also specify status messages 154 that the real-time robotic control system 150 can use to determine if an exit condition of a subgraph of the state machine has been satisfied. That is, the real-time robotic control system 150 can use the received status messages 154 to determine, in real-time, when to transfer to a different nodes in the state machine, and in particular to different subgraphs in the state machine. The generated schedule 135 satisfies each of the constraint definitions 112.

The scheduler 120 gives the schedule 135 to the real-time robotic control system 150, which executes the state machine according to the schedule 135. That is, the real-time robotic control system 150 issues the commands 155 to the workcell 170 in order to drive the movements of the robots 170a-n. In response, the robots in the workcell 170 send the status messages 154 that include information about the current state the robots and the tasks. The real-time robotic control system 150 can use the status messages 154 to determine when to perform online mode switching between the inverse kinematics coordinate transformation process and the Cartesian impedance control coordinate transformation process.

Figure 2:
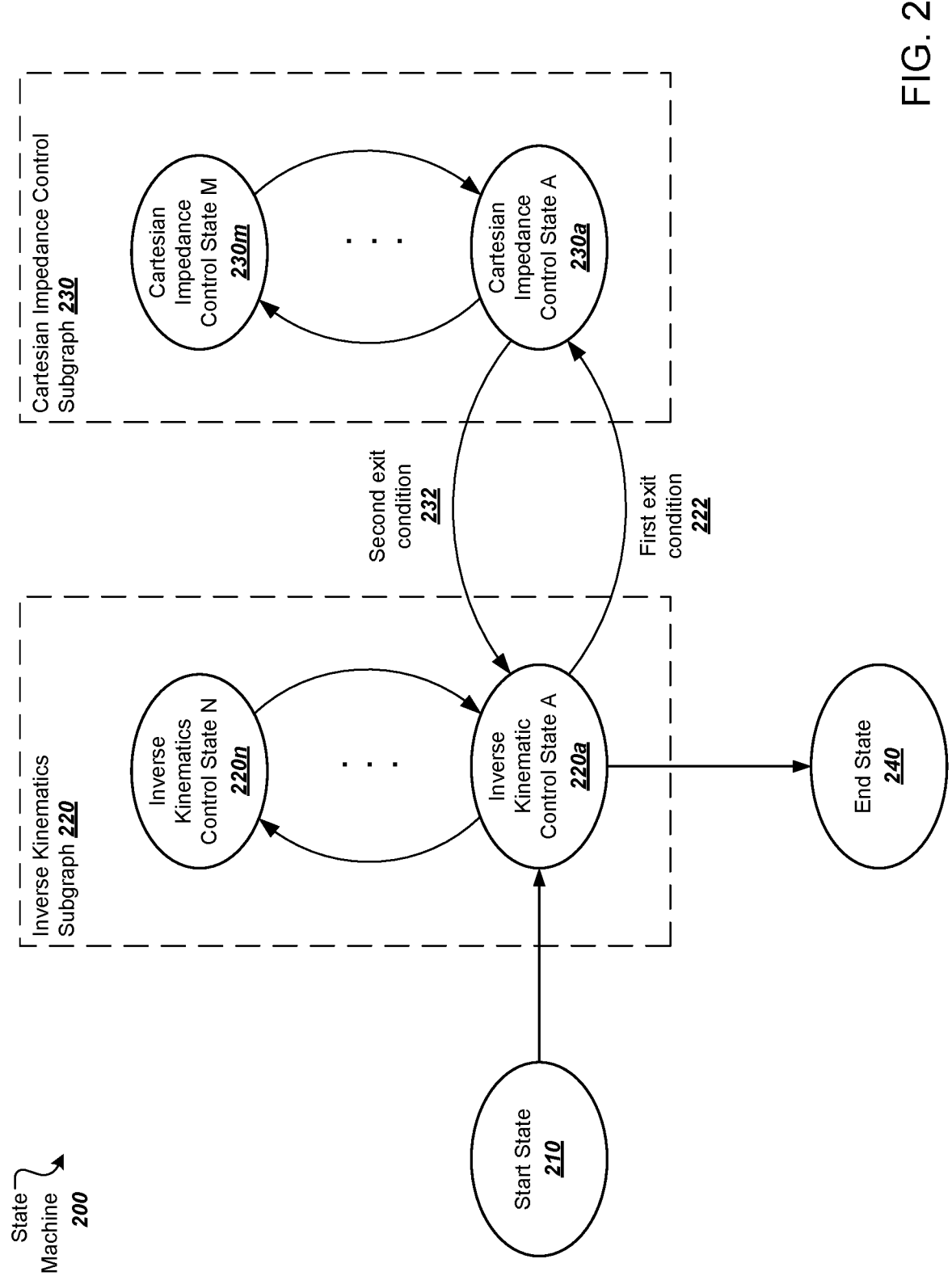
FIG. 2 illustrates an example state machine with two subgraphs.

FIG. 2 illustrates an example state machine 200 that includes two subgraphs: an inverse kinematics subgraph 220 and a Cartesian impedance control subgraph 230. The example state machine 200 can be used by a system, e.g., the real-time robotic control system 150 depicted in FIG. 1, to control a robot to move from a starting point in a workcell to an outlet, insert a plug into the outlet, and return to the starting point.

A user can specify the state machine 200 so that each node in the state machine 200 executes uses the coordinate transformation process that best satisfies the goals and constraints of the node. In particular, the nodes in the inverse kinematics subgraph 220 are used to move the robot to the outlet and later back to the starting point, and the nodes in the Cartesian impedance control subgraph 230 are used to control the robot to insert the plug into the outlet.

An inverse kinematics (IK) coordinate transformation process enjoys swift and low-error convergence when transforming a position goal from a Cartesian coordinate space to a joint coordinate space. A Cartesian impedance control (IC) coordinate transformation process, however, often performs relatively poorly at moving to a Cartesian position. Thus, the user can specify that IK be used to move the robot to the outlet with a high degree of accuracy.

The IK coordinate transformation process, however, can be unsuitable for interacting with other objects in a granular or reactive way. If IK were used to insert the plug into the outlet, the process might be vulnerable to very slight changes in the position of the robot relative to the outlet (e.g., on the order of millimeters) that the robot would be unable to adapt to. Thus, the robot might break the tip of the plug or otherwise fail to insert the plug into the outlet. The IC coordinate transformation process, on the other hand, is able to react to external torques when interacting with other objects, allowing the robot to manipulate the plug in a compliant way. That is, IC is able to react to disturbances, e.g., if the robot is slightly misaligned relative to the outlet. Thus, the user can specify that IC be used to insert the plug into the outlet with a high compliance, leading to better system performance.

Referring back to FIG. 2, the state machine 200 has a start state 210 that initiates the sequence of operations, moving the state machine into the IK subgraph 220. The IK subgraph includes N control states 220a-n, which control the robot as it moves to a specified Cartesian position, in this case the position of the outlet in the workcell. As the robot moves, it can send status messages back to the system that include information about the current state of the robot and the task. The system can use these status messages to determine when to transfer between nodes in the IK subgraph 220. The system can also use these status messages to determine when an exit condition of the IK subgraph 220 has been satisfied.

The exit conditions of the IK subgraph 220 identify when the system should transfer to the IC subgraph 230, i.e., when the system should mode switch from the IK coordinate transformation process to the IC coordinate transformation process. For example a first exit condition 222 represents when the robot has arrived at the outlet; that is, when the Cartesian position of the robot is within a specified tolerance of the Cartesian goal position.

When the first exit condition 222 is satisfied, the system transfers from the IK control state 220a to a Cartesian impedance control state 230a. The IC subgraph include M control state 220a-m, which control the robot as it manipulates the plug. The robot again sends status messages about the current state of the robot and the task, which the system can use to determine when to transfer between nodes in the IC subgraph 230.

The IC subgraph 230 also has exit conditions that transfer the system back to the IK subgraph 220. For example, a second exit condition 232 represents when the robot has completed the subtask of inserting the plug into the outlet.

When the second exit condition 232 is satisfied, the system transfers from the IC control state 230a back to the IK control state 220a, and uses nodes in the IK subgraph 220 to control the robot to move to the Cartesian position that characterizes the original starting position of the robot. As before, the robot sends status messages about the current state of the robot and the task. When the system determines that the robot has returned, within a specified tolerance, to the Cartesian goal position of the starting position, the state machine 200 transfers to an end state 240, signifying that the task has been completed.

In some implementations, when the robot completes the task represented by the state machine 200, the robot can loop back and begin the same task again. That is, there can be an implicit edge between the end state 240 and the start state 210.

The commands sent by the IK subgraph 220 and the IC subgraph 230 are fundamentally the same command: "move-to-Cartesian-pose." The main difference between the two subgraphs lies in how they infer joint poses using the goal Cartesian poses.

Figure 3:
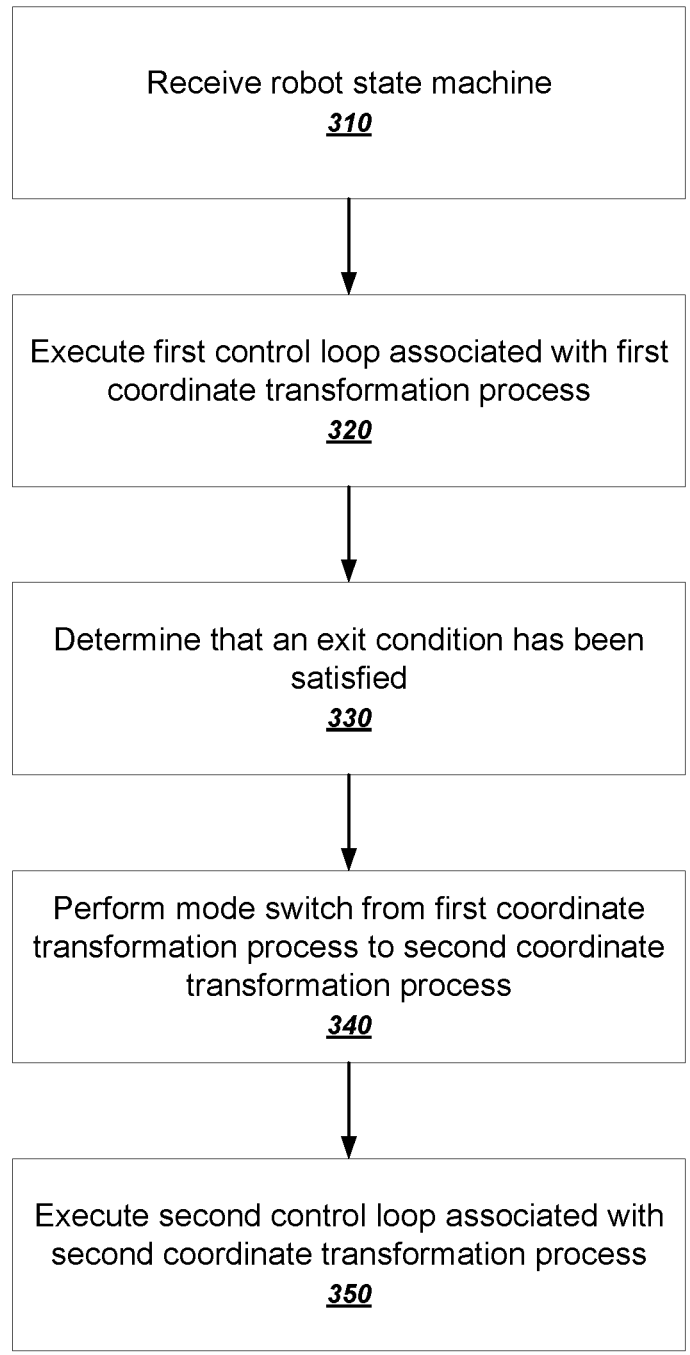
FIG. 3 is a flowchart of an example process for performing transformation mode switching in a robotics control system.

FIG. 3 is a flowchart of an example process 300 for performing transformation mode switching in a robotics control system. The process 300 can be implemented by one or more computer programs installed on one or more computers and programmed in accordance with this specification. For example, the process 300 can be performed by the real-time robotic control system 150 shown in FIG. 1. For convenience, the process will be described as being performed by a robotics control system of one or more computers, or simply a "system."

The system receives data representing a state machine (step 310). The state machine defines one or more portions of a robotics task. Nodes of the state machine represent respective states, and each node has one or more exit conditions that define when the system should transition from one state to another state.

The system executes a first control loop corresponding to a first node of the state machine (step 320). The first control loop includes i) repeatedly providing commands to one or more robotic components computed from a first coordinate transformation process, and ii) repeatedly receiving status messages.

The system determines that an exit condition for the first node has been satisfied (step 330). The system can make the determination based on one or more status messages received during the first control loop.

The system performs a mode switch between the first coordinate transformation process and a different second coordinate transformation process (step 340). In some implementations, this mode switch can occur within real-time constraints of the robotics control system.

The system executes a second control loop corresponding to a second node of the state machine (step 350). The second control loop includes repeatedly providing commands to one or more robotic components computed from the second coordinate transformation.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move. The join collection controller can also provide abstractions for lower-level hardware components, e.g., in the form of contextually-significant collections, to higher-level system components.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle, and the ability to react to higher-level subsystem failure by providing set-point generation redundancy, allows greatly increased flexibility in control over conventional robot control systems.

At a next-highest level, the software stack can include joint controllers. A joint controller can receive goal parameters and dynamically compute commands required to achieve the goal parameters. For example, a joint controller can receive a position goal and can compute a set point for achieve the goal.

At a next-highest level, the software stack can include Cartesian controllers and Cartesian selection controllers. A Cartesian controller can receive as input goals in Cartesian space and use inverse kinematics solvers to compute an output in joint position space. The Cartesian selection controller can then enforce limit policies on the results computed by the Cartesian controllers before passing the computed results in joint position space to a joint controller in the next lowest level of the stack. That is, the Cartesian selection controller provides a similar functionality to the joint selection controller except in Cartesian space instead of joint space, i.e., choosing an appropriate Cartesian set-point and providing set-point redundancy to protect against higher-level controller malfunction. For example, a Cartesian controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in a way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as i) they support the same degrees of freedom and accept set-points of the same type, and ii) the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving, by a robotics control system comprising one or more computers, data representing a state machine that defines one or more portions of a robotics task, wherein the state machine has nodes that represent respective states of one or more robotic components, wherein each node has one or more exit conditions that define when the robotics control system should transition from one state to another state;
  executing a first control loop corresponding to a first node of the state machine, wherein executing the first control loop comprises providing commands to the one or more robotic components computed from a first coordinate transformation process and receiving status messages;
  determining, based on one or more status messages received during the first control loop, that an exit condition for the first node has been satisfied;
  in response, performing a mode switch between the first coordinate transformation process and a different second coordinate transformation process; and
  executing a second control loop corresponding to a second node of the state machine, wherein executing the second control loop comprises providing commands to the one or more robotic components computed from the second coordinate transformation process.

Embodiment 2 is the method of embodiment 1, wherein performing the mode switch occurs within real-time constraints of the robotics control system.

Embodiment 3 is the method of any one of embodiments 1 or 2, wherein the first coordinate transformation process is an inverse kinetics coordinate transformation process and the second coordinate transformation process is a Cartesian impedance control coordinate transformation process.

Embodiment 4 is the method of any one of embodiments 1-3, wherein a user of the robotics control system has specified that the first control loop corresponding to the first node of the state machine be executed using the first coordinate transformation process, and that the second control loop corresponding to the second node of the state machine be executed using the second coordinate transformation process.

Embodiment 5 is the method of any one of embodiments 1-5, wherein one or more of the exit conditions of the state machine have been specified by a user of the robotics control system.

Embodiment 6 is the method of any one of embodiments 1-5, wherein:
  executing the second control loop further comprises receiving status messages; and
  the method further comprises:
    determining, based on one or more status messages received during the second control loop, that an exit condition for the second node has been satisfied;
    in response, performing a mode switch between the second coordinate transformation process and a third coordinate transformation process that is different from that second coordinate transformation process; and
    executing a third control loop corresponding to a third node of the state machine, wherein executing the third control loop comprises repeatedly providing commands to one or more robotic components computed from the third coordinate transformation process.

Embodiment 7 is the method of embodiment 6, wherein the third coordinate transformation process is different from the first coordinate transformation process and the second coordinate transformation process.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
receiving, from a user by a robotics control system comprising one or more computers, data representing a user-defined state machine that defines one or more portions of a robotics task, each portion being represented by a different subgraph of the state machine, wherein each subgraph is associated with a different respective coordinate transformation process, wherein the state machine has nodes that represent respective states of one or more robotic components, wherein each node has one or more exit conditions that define when the robotics control system should transition from one state to another state, and when the robotics control system should transition from executing a first subgraph of the state machine having a first coordinate transformation process to executing a second subgraph of the state machine having a different second coordinate transformation process;
executing, by the robotics control system, a first control loop corresponding to a first subgraph of the state machine having the first coordinate transformation process, wherein executing the first control loop comprises providing commands to the one or more robotic components computed from the first coordinate transformation process and receiving status messages;
determining, based on one or more status messages received during the first control loop, that an exit condition for transitioning to executing the second subgraph has been satisfied;
in response to determining that the exit condition for transitioning to executing the second subgraph has been satisfied, performing a mode switch between the first coordinate transformation process of the first subgraph and the different second coordinate transformation process of the second subgraph; and
executing, by the robotics control system, a second control loop corresponding to the second subgraph of the state machine having the second coordinate transformation process, wherein executing the second control loop comprises providing commands to the one or more robotic components computed from the second coordinate transformation process.

2. The method of claim 1, wherein performing the mode switch occurs within real-time constraints of the robotics control system.

3. The method of claim 1, wherein the first coordinate transformation process is an inverse kinetics coordinate transformation process and the second coordinate transformation process is a Cartesian impedance control coordinate transformation process.

4. The method of claim 1, wherein a user of the robotics control system has specified that the first control loop corresponding to the first subgraph of the state machine be executed using the first coordinate transformation process, and that the second control loop corresponding to the second subgraph of the state machine be executed using the second coordinate transformation process.

5. The method of claim 1, wherein one or more of the exit conditions of the state machine have been specified by a user of the robotics control system.

6. The method of claim 1, wherein:
executing the second control loop further comprises receiving status messages; and
the method further comprises:
determining, based on one or more status messages received during the second control loop, that an exit condition for transitioning to executing a third subgraph has been satisfied;
in response to determining that the exit condition for transitioning to executing the third subgraph has been satisfied, performing a mode switch between the second coordinate transformation process of the second subgraph and a third coordinate transformation process that is different from that second coordinate transformation process; and
executing, by the robotics control system, a third control loop corresponding to the third subgraph of the state machine having the third coordinate transformation process, wherein executing the third control loop comprises repeatedly providing commands to one or more robotic components computed from the third coordinate transformation process.

7. The method of claim 6, wherein the third coordinate transformation process is different from the first coordinate transformation process and the second coordinate transformation process.

8. A robotics control system comprising one or more computers and one or more storage devices storing instructions that are operable, when executed by the one or more computers, to cause the one or more computers to perform a method comprising:
receiving, from a user by a robotics control system comprising one or more computers, data representing a user-defined state machine that defines one or more portions of a robotics task, each portion being represented by a different subgraph of the state machine, wherein each subgraph is associated with a different respective coordinate transformation process, wherein the state machine has nodes that represent respective states of one or more robotic components, wherein each node has one or more exit conditions that define when the robotics control system should transition from one state to another state, and when the robotics control system should transition from executing a first subgraph of the state machine having a first coordinate transformation process to executing a second subgraph of the state machine having a different second coordinate transformation process;
executing, by the robotics control system, a first control loop corresponding to a first subgraph of the state machine having the first coordinate transformation process, wherein executing the first control loop comprises providing commands to the one or more robotic components computed from the first coordinate transformation process and receiving status messages;
determining, based on one or more status messages received during the first control loop, that an exit condition for transitioning to executing the second subgraph has been satisfied;
in response to determining that the exit condition for transitioning to executing the second subgraph has been satisfied, performing a mode switch between the first coordinate transformation process of the first subgraph and the different second coordinate transformation process of the second subgraph; and
executing, by the robotics control system, a second control loop corresponding to the second subgraph of the state machine having the second coordinate transformation process, wherein executing the second control loop comprises providing commands to the one or more robotic components computed from the second coordinate transformation process.

9. The system of claim 8, wherein performing the mode switch occurs within real-time constraints of the robotics control system.

10. The system of claim 8, wherein the first coordinate transformation process is an inverse kinetics coordinate transformation process and the second coordinate transformation process is a Cartesian impedance control coordinate transformation process.

11. The system of claim 8, wherein a user of the robotics control system has specified that the first control loop corresponding to the first subgraph of the state machine be executed using the first coordinate transformation process, and that the second control loop corresponding to the second subgraph of the state machine be executed using the second coordinate transformation process.

12. The system of claim 8, wherein one or more of the exit conditions of the state machine have been specified by a user of the robotics control system.

13. The system of claim 8, wherein:
executing the second control loop further comprises receiving status messages; and
the method further comprises:
determining, based on one or more status messages received during the second control loop, that an exit condition for transitioning to executing a third subgraph has been satisfied;
in response to determining that the exit condition for transitioning to executing the third subgraph has been satisfied, performing a mode switch between the second coordinate transformation process of the second subgraph and a third coordinate transformation process that is different from that second coordinate transformation process; and
executing, by the robotics control system, a third control loop corresponding to a the third node subgraph of the state machine having the third coordinate transformation process, wherein executing the third control loop comprises repeatedly providing commands to one or more robotic components computed from the third coordinate transformation process.

14. The system of claim 13, wherein the third coordinate transformation process is different from the first coordinate transformation process and the second coordinate transformation process.

15. One or more non-transitory computer storage media encoded with computer program instructions that when executed by a plurality of computers cause the plurality of computers to perform operations comprising:
receiving, from a user by a robotics control system comprising one or more computers, data representing a user-defined state machine that defines one or more portions of a robotics task, each portion being represented by a different subgraph of the state machine, wherein each subgraph is associated with a different respective coordinate transformation process, wherein the state machine has nodes that represent respective states of one or more robotic components, wherein each node has one or more exit conditions that define when the robotics control system should transition from one state to another state, and when the robotics control system should transition from executing a first subgraph of the state machine having a first coordinate transformation process to executing a second subgraph of the state machine having a different second coordinate transformation process;
executing, by the robotics control system, a first control loop corresponding to a first subgraph of the state machine having the first coordinate transformation process, wherein executing the first control loop comprises providing commands to the one or more robotic components computed from the first coordinate transformation process and receiving status messages;
determining, based on one or more status messages received during the first control loop, that an exit condition for transitioning to executing the second subgraph has been satisfied;
in response to determining that the exit condition for transitioning to executing the second subgraph has been satisfied, performing a mode switch between the first coordinate transformation process of the first subgraph and the different second coordinate transformation process of the second subgraph; and
executing, by the robotics control system, a second control loop corresponding to the second subgraph of the state machine having the second coordinate transformation process, wherein executing the second control loop comprises providing commands to the one or more robotic components computed from the second coordinate transformation process.

16. The non-transitory computer storage media of claim 15, wherein performing the mode switch occurs within real-time constraints of the robotics control system.

17. The non-transitory computer storage media of claim 15, wherein the first coordinate transformation process is an inverse kinetics coordinate transformation process and the second coordinate transformation process is a Cartesian impedance control coordinate transformation process.

18. The non-transitory computer storage media of claim 15, wherein a user of the robotics control system has specified that the first control loop corresponding to the first subgraph of the state machine be executed using the first coordinate transformation process, and that the second control loop corresponding to the second subgraph of the state machine be executed using the second coordinate transformation process.

19. The non-transitory computer storage media of claim 15, wherein one or more of the exit conditions of the state machine have been specified by a user of the robotics control system.

20. The non-transitory computer storage media of claim 15, wherein:
executing the second control loop further comprises receiving status messages; and
wherein the operations further comprise:
determining, based on one or more status messages received during the second control loop, that an exit condition for transitioning to executing a third subgraph has been satisfied;
in response to determining that the exit condition for transitioning to executing the third subgraph has been satisfied, performing a mode switch between the second coordinate transformation process of the second subgraph and a third coordinate transformation process that is different from that second coordinate transformation process; and
executing, by the robotics control system, a third control loop corresponding to a the third node subgraph of the state machine having the third coordinate transformation process, wherein executing the third control loop comprises repeatedly providing commands to one or more robotic components computed from the third coordinate transformation process.

\* \* \* \* \*